US012002044B2

(12) United States Patent
Muchang et al.

(10) Patent No.: US 12,002,044 B2
(45) Date of Patent: Jun. 4, 2024

(54) BROWSER EXTENSION WITH ADDITIONAL CAPABILITIES

(71) Applicant: VISA INTERNATIONAL SERVICE ASSOCIATION, San Francisco, CA (US)

(72) Inventors: Yobel Muchang, San Francisco, CA (US); Svetlana Trushchenkova, San Francisco, CA (US); Mayank Somaiya, San Francisco, CA (US); Michael Jabbara, San Francisco, CA (US); David Badley, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/321,034

(22) Filed: May 14, 2021

(65) Prior Publication Data

US 2021/0272115 A1    Sep. 2, 2021

Related U.S. Application Data

(63) Continuation of application No. 14/938,530, filed on Nov. 11, 2015, now Pat. No. 11,120,443.

(51) Int. Cl.
| | |
|---|---|
| *G06Q 20/40* | (2012.01) |
| *G06F 3/0481* | (2022.01) |
| *G06F 40/174* | (2020.01) |
| *G07G 1/00* | (2006.01) |
| *H04L 67/02* | (2022.01) |

(52) U.S. Cl.
CPC .......... *G06Q 20/40* (2013.01); *G06F 3/0481* (2013.01); *G06F 40/174* (2020.01); *G06Q 20/4014* (2013.01); *G06Q 20/40145* (2013.01); *G07G 1/0009* (2013.01); *H04L 67/02* (2013.01)

(58) Field of Classification Search
CPC ............... G06Q 20/40; G06Q 20/4014; G06Q 20/40145; G06F 3/0481; G06F 40/174; G07G 1/0009; H04L 67/02
See application file for complete search history.

(56) References Cited

U.S. PATENT DOCUMENTS

| | | |
|---|---|---|
| 8,214,362 B1 | 7/2012 | Djabarov |
| 8,402,555 B2 | 3/2013 | Grecia |

(Continued)

FOREIGN PATENT DOCUMENTS

| | | |
|---|---|---|
| CN | 103765465 A | 4/2014 |
| JP | 2004535619 A | 11/2004 |

(Continued)

OTHER PUBLICATIONS

Why Do Chrome Plugins Need Access To 'All My Data' and 'Browsing Activity'? (Year: 2012).*

(Continued)

*Primary Examiner* — Scott C Anderson
*Assistant Examiner* — James H Miller
(74) *Attorney, Agent, or Firm* — K&L Gates LLP

(57) ABSTRACT

An expedited payment service may be accessed through a browser extension. As an extension operates in a manner in which it has access to the underlying merchant data, the extension may allow an expedited payment service to work with virtually any merchant web site to complete payment transactions.

23 Claims, 15 Drawing Sheets

(56) References Cited

U.S. PATENT DOCUMENTS

| | | | |
|---|---|---|---|
| 8,533,860 B1 | 9/2013 | Grecia | |
| 8,887,308 B2 | 11/2014 | Grecia | |
| 9,373,141 B1* | 6/2016 | Shakkarwar | G07F 17/32 |
| 10,885,541 B1* | 1/2021 | Ho | G06Q 30/0233 |
| 11,120,443 B2* | 9/2021 | Muchang | G06Q 20/40145 |
| 2004/0139008 A1 | 7/2004 | Mascavage, III | |
| 2006/0212706 A1 | 9/2006 | Jiang | |
| 2009/0177587 A1* | 7/2009 | Siegal | G06Q 20/10 |
| | | | 705/67 |
| 2012/0191576 A1* | 7/2012 | Bui | G06Q 30/0601 |
| | | | 705/27.1 |
| 2012/0316992 A1* | 12/2012 | Oborne | G06Q 20/384 |
| | | | 705/26.41 |
| 2013/0054336 A1 | 2/2013 | Graylin | |
| 2014/0122329 A1 | 5/2014 | Naggar | |
| 2014/0122338 A1* | 5/2014 | Cueli | G06Q 40/00 |
| | | | 705/35 |
| 2014/0122344 A1* | 5/2014 | Foulds | G06Q 20/3278 |
| | | | 705/65 |
| 2014/0250007 A1* | 9/2014 | Howe | G06Q 20/409 |
| | | | 705/44 |
| 2014/0250010 A1* | 9/2014 | Howe | G06Q 20/389 |
| | | | 705/44 |
| 2014/0351146 A1 | 11/2014 | Johnson | |
| 2014/0372308 A1* | 12/2014 | Sheets | G06Q 20/20 |
| | | | 705/44 |
| 2014/0372861 A1* | 12/2014 | Lawless | G06F 40/143 |
| | | | 715/224 |
| 2017/0132624 A1 | 5/2017 | Muchang | |

FOREIGN PATENT DOCUMENTS

| | | | | |
|---|---|---|---|---|
| WO | WO-02075478 A2 * | 9/2002 | | G06Q 20/02 |
| WO | WO-2014020622 A1 * | 2/2014 | | G06Q 20/02 |

OTHER PUBLICATIONS

Chinese Office Action (with English translation) for App. No. CN201680066252.1, dated Aug. 10, 2021, 7 pages.

Chinese Office Action (with English translation) issued in App. No. CN201680066252.1, dated Mar. 30, 2022, 5 bages.

Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.

International Search Report and Written Opinion, in corresponding International Application No. PCT/US2016/061432, mailed Jan. 30, 2017, 7 pages.

Office Action dated Feb. 26, 2019 for U.S. Appl. No. 14/938,530 (pp. 1-14).

Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.

Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.

Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.

Extended European Search Report for Application No. 16865048.9, dated Apr. 24, 2019, 8 pages.

Office Action dated Aug. 22, 2019 for U.S. Appl. No. 14/938,530 (pp. 1-16).

Office Action dated Feb. 5, 2020 for U.S. Appl. No. 14/938,530 (pp. 1-16).

Office Action dated Jul. 28, 2020 for U.S. Appl. No. 14/938,530 (pp. 1-19).

Norton UK Blog, "What you need to know about cookies," Jul. 7, 2015 (Year: 2015).

Office Action dated Nov. 17, 2020 for U.S. Appl. No. 14/938,530 (pp. 1-18).

Notice of Allowance dated Apr. 28, 2021 for U.S. Appl. No. 14/938,530 (pp. 1-19).

Chinese Office Action (with English translation) for App. No. CN201680066252.1 dated Oct. 12, 2020, 11 pages.

Extended European Search Report for corresponding European Patent Application No. 23165412.0, dated Jun. 5, 2023.

* cited by examiner

WWW.STOREA.COM/CHECKOUT

PAYMENT INFO
Card number
Expiration

BILLING ADDRESS
First Name
Last Name
Address
Town
ZIP

YOUR ORDER
| Product | Total |
|---|---|
| Cups | $20.00 |
| Subtotal | $20.00 |
| Shipping | Free! |
| Order total | $20.00 |

PLACE ORDER 207
301 — OFFERS
303 — CHECKOUT

PAYMENT INFO

Card number

Expiration

BILLING ADDRESS

First Name

Last Name

Address

Town:

ZIP

YOUR ORDER

| Product | Total |
|---|---|
| Cups | $20.00 |
| Subtotal | $20.00 |
| Shipping | Free! |
| Order total | $20.00 |

PLACE ORDER

WWW.STOREA.COM/CHECKOUT

Ralph@ralph.com
Not you?
******** GO
— CARD A
— CARD B

WWW.STOREA.COM/CHECKOUT

PAYMENT INFO

Card number

Expiration

BILLING ADDRESS

First Name

Last Name

Address

Town

ZIP

YOUR ORDER

Product     Total

Cups        $20.00

Subtotal    $20.00

Shipping    Free!

Order total $20.00

PLACE ORDER

WWW.STOREA.COM/CHECKOUT

WELCOME BACK!
Ralph@ralph.com
Not you?
[password]
SIGN IN

PAYMENT INFO
Card number
Expiration

BILLING ADDRESS
First Name
Last Name
Address
Town
ZIP

YOUR ORDER
Product         Total
Cups            $20.00
Subtotal        $20.00
Shipping        Free!
Order total     $20.00

PLACE ORDER

211

WELCOME BACK!
Ralph@ralph.com
Not you?
********
SIGN IN

WWW.STOREA.COM/CHECKOUT

PAYMENT INFO
Card number
Expiration
BILLING ADDRESS
First Name
Last Name
Address
Town
Zip YOUR ORDER
Product          Total
Cups             $20.00
Subtotal         $20.00
Shipping         Free!
Order total      $20.00

PLACE ORDER

Fig. 4c

BROWSER EXTENSION WITH ADDITIONAL CAPABILITIES

CROSS-REFERENCE TO RELATED APPLICATION

This is a continuation application of U.S. patent application Ser. No. 14/938,530, filed on Nov. 11, 2015, of which is incorporated by reference in its entirety herein.

BACKGROUND

Online commerce has become common. As users become more and more accustomed to making purchases online, the expectations for ease of use and security of payment increase.

SUMMARY

A browser extension is disclosed which has multiple technical features which make online payments easier and more secure. In one aspect, an expedited payment service is accessed through a browser extension. As the expedited payment service has already been created, the amount of information that needs to be entered to create a transaction is minimal. Further, as an extension operates in a manner in which it has access to the underlying merchant data, the payment and authorization data may be tailored to the specific merchant.

BRIEF DESCRIPTION OF THE DRAWINGS

FIG. 2b may be an illustration of a first embodiment of a payment extension as a pop up area;

FIG. 2c may be an illustration of a first embodiment of a payment extension as a pop up area where a user may select a payment device and whether to autofill the payment display;

FIG. 3b may be an illustration of a second embodiment of a payment extension being activated by selecting the extension indication;

FIG. 3d may be an illustration of a second embodiment of a payment extension where a user may enter authentication data, select a payment device and whether to autofill the payment display;

FIG. 3e may be an illustration of a second embodiment of a payment extension where the transaction has successfully completed as indicated by the extension indicator;

FIG. 4b may be an illustration of a third embodiment of a payment extension appearing as a side bar and requesting authentication data;

FIG. 4c may be an illustration of a third embodiment of a payment extension appearing as a side bar and receiving authentication data;

The figures depict a preferred embodiment for purposes of illustration only. One skilled in the art may readily recognize from the following discussion that alternative embodiments of the structures and methods illustrated herein may be employed without departing from the principles described herein.

Specification

Figure 1:
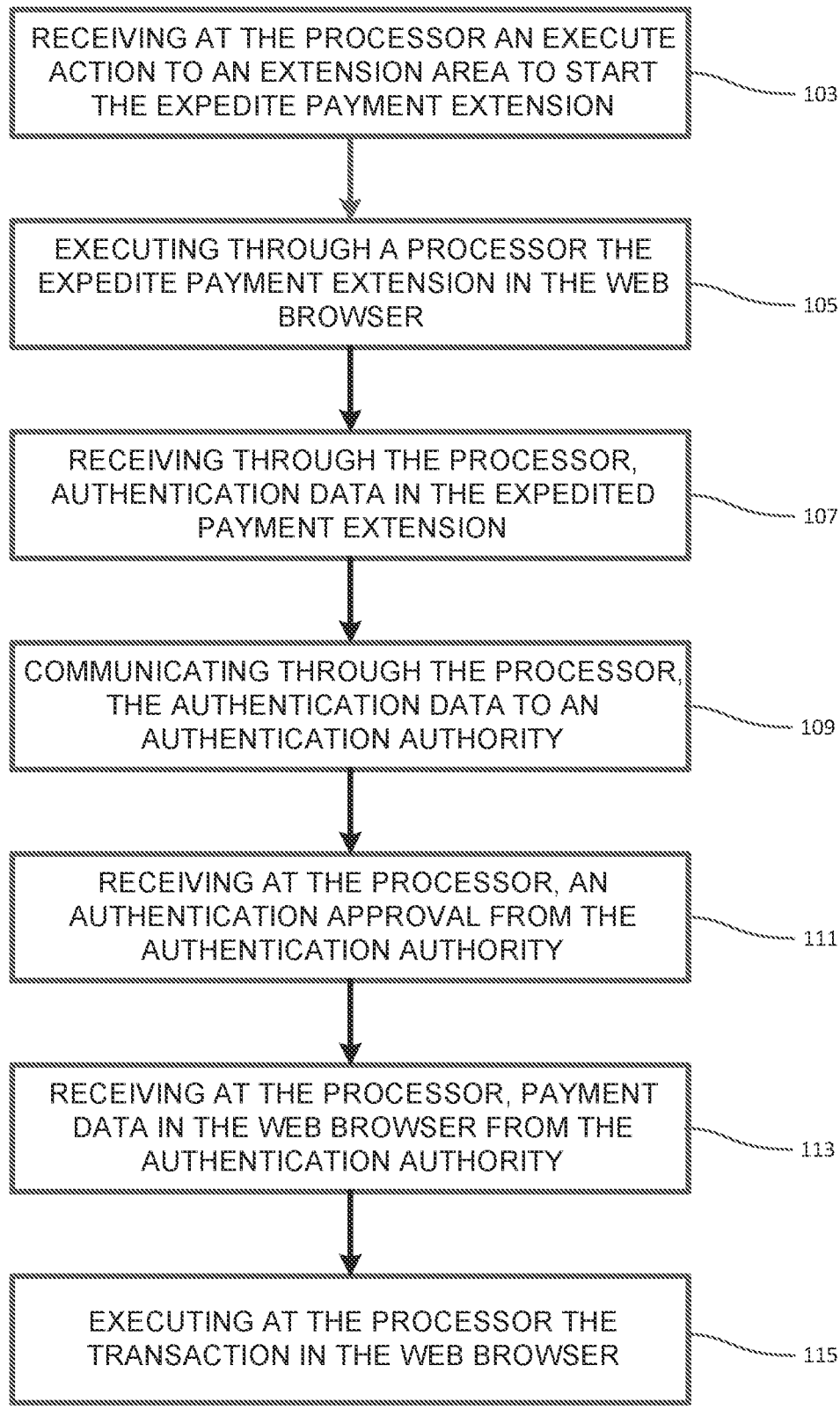
FIG. 1 may be a flow chart that illustrates one embodiment of the claims.

FIG. 1 may be a flow chart that illustrates one embodiment of the claims which calls for a web browser extension to expedite payments. Web browsers assist user's interactions with networks, including the World Wide Web. Browsers may have extensions. Extensions add functionality to a web browser or other application without diving deeply into native code. Extensions may be created for browsers with those core technologies that are already familiar to designers with from web development: HTML, CSS, and JavaScript.

In simple terms, an extension may be a zipped bundle of files—HTML, CSS, JavaScript, images, and anything else needed—that adds functionality to the browser. Extensions may be essentially web pages, and extensions may use all the APIs that the browser provides to web pages, from XMLHttpRequest to JSON to HTML5. Extensions may interact with web pages or servers using content scripts or cross-origin XMLHttpRequests. Extensions may also interact programmatically with browser features such as bookmarks and tabs. If an extension needs to interact with web pages, then it may need a content script. A content script may be some JavaScript that executes in the context of a page that's been loaded into the browser. It may be easier to think of a content script as part of that loaded page, not as part of the extension it was packaged with (its parent extension). Content scripts may be able to read details of the web pages the browser visits, and the scripts may be able to make changes to the pages.

Referring again to FIG. 1, at block 103, a processor may receive in a browser 201 (FIG. 2a) an execute action 203 to an extension area 205 to start the expedite payment extension 207. The extension area 205 may have a variety of forms. In one embodiment, the execute action 203 may be a user inputting an execute action 203 on an extension area 205 where the execute action 203 is a mouse click and the extension area 205 is a visual indication like a circle in a browser action bar that an extension is available. Logically, the extension area 205 may have a variety of shapes, colors, formats, visual attention creating actions, etc., which may be defined by the requirements of the browser 201.

At block 105, once the extension area 205 has received an acceptable input action 203, the expedite payment extension 207 (FIG. 2b) may be executed in the web browser 201. As mentioned previously, the extension 207 may be integrated into the browser 201 or other computing application. The extension 207 may be visual to a user in the form of a sidebar such as in FIGS. 4a-4f, a miniature area such as in FIGS. 3a-3c and a miniature entry graphical user interface such as in FIGS. 2a-2e.

The format of the extension 207 may take on a variety of forms. In one embodiment, the extension 207 may attempt to mimic the visual appearance of the related checkout page in the browser 201. In other embodiments, the extension 207 may be branded to emphasize the provider of the expedited payment extension 207. In yet another embodiment, the extension 207 may allow a plurality of payment devices 209 (FIG. 2c) (for example and not limitation, a credit card, a loyalty card, a debit card, a brokerage account, etc.) to be used and the visual appearance of the extension 207 may change to mimic the selected payment device 209. For example, a brokerage account may be known as using the color green and if the brokerage account is selected as the payment device 209, the extension 207 may be modified to use the brokerage color of green.

Of course, the extension 207 may be modified in a variety of manners to make payments and transactions easier and more secure for users. As security of payment details is a concern to consumers, efforts may be made to ensure the extension 207 appears to be legitimate and not like a phishing site. As mentioned previously, the extension 207 may review the merchant website in the browser 201 and attempt to mimic the look of the merchant website. As extensions 207 usually have to be approved by an authority such as a browser issuer, only approved extensions would have access to the merchant websites and would be able to attempt to match the web site of a plurality of retailers. Common ways to mimic the merchant website in a browser 201 include analyzing the colors, fonts and spacing of the merchant web site and trying to mimic the color, fonts and spacing in the extension 207. In another embodiment, the extension 207 may have colors, fonts and spacing that is known for the expedited payment service.

At block 107, authentication data 211 may be received in the expedited extension 207. Authentication data 211 may take on a variety of forms depending on the payment extension 207 and the technical capabilities of the computing device. In a simple embodiment, a sign in name may be stored locally in an electronic cookie and the authentication data 211 may be a password. In an additional embodiment, the user name may not be stored locally and it may be entered by the user along with a password to create the authentication data 211.

In yet another embodiment, the authentication data 211 may be biometric such as a fingerprint from an electronic imaging device in communication with the computing device. Biometric data may take on a variety of forms such as voice, fingerprints, skin tone, retina scans, etc. The biometric data may be received and communicated to an authentication service which will analyze the biometric data and determine if the user is known. If the user is not known, either based on the name/password or the biometric data, a message may be displayed to the user indicating the authentication was not successful.

The authentication data 211 may contain additional information. As the extension 207 has access to some or all of the data in the browser, the authentication data 211 may include purchase data from the web browser such as merchant data or items purchased data. This data may be communicated to the payment processing network where it may be analyzed for fraud and to improve additional fraud algorithms in the future.

At block 109, authentication data 211 may be communicated to an authentication authority. In some embodiments, the authentication data 211 may be communicated to an authentication authority over a payment processing network. A payment processing network is a dedicated network that receives payment data, and communicates it to the various entities in the payment process. The payment processing network is different than a traditional network in that access is limited and security is extremely high.

At block 111, an authentication approval from the authentication authority may be received. Again, in some embodiments, the authentication approval may be communicated through a payment processing network. The authentication data 211 may be simple, such as a yes or may be more complex and include additional information such as the amount available to spend on the selected payment device, etc.

At block 113, payment data 213 (FIG. 2a) may be received in the web browser from the authentication authority. In some embodiments, the payment data 213 may include a payment token. A payment token may be a one-time use code that is known to the payment processor. In some embodiments, the payment token may be specific to the merchant in question. Payment tokens are becoming more and more common and may allow increased security as the token changes. Thus, even if a thief copies a token from a transaction, it is very unlikely the token will work for later transactions. In embodiments where the merchant is known, the token may be created to be merchant specific which may result in additional security.

The payment data 213 may also include payment data which may include a payment account and expiration date. The payment data account data and expiration data may be used to fill in the fields in the browser 201. Logically, the payment data 213 may also include a name, a billing address and a shipping address which may be auto-filled in the underlying browser 201.

Figure 4A:
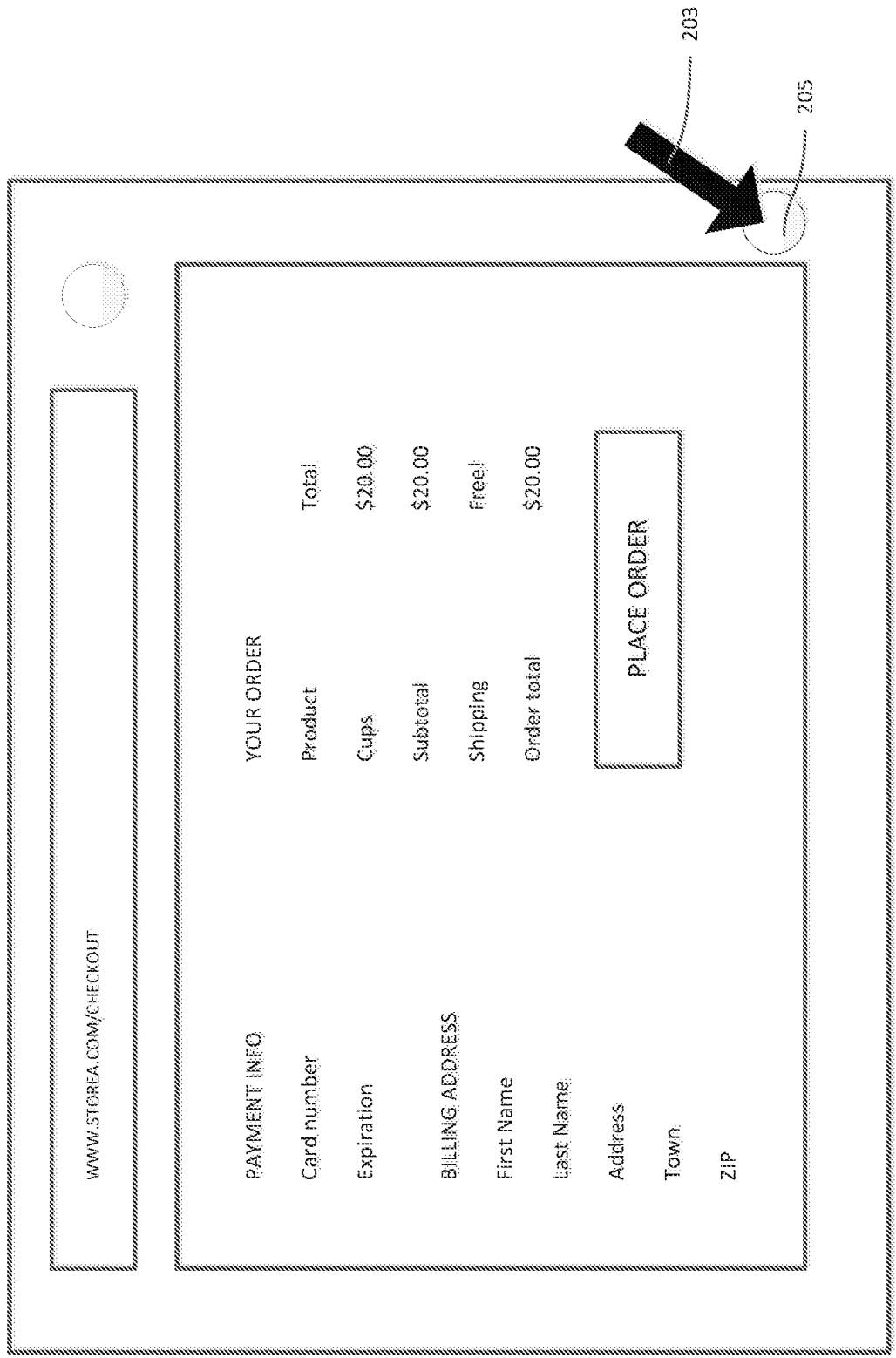
FIG. 4a may be an illustration of a third embodiment of a payment extension being activated by selecting the extension indication.
Figure 5:
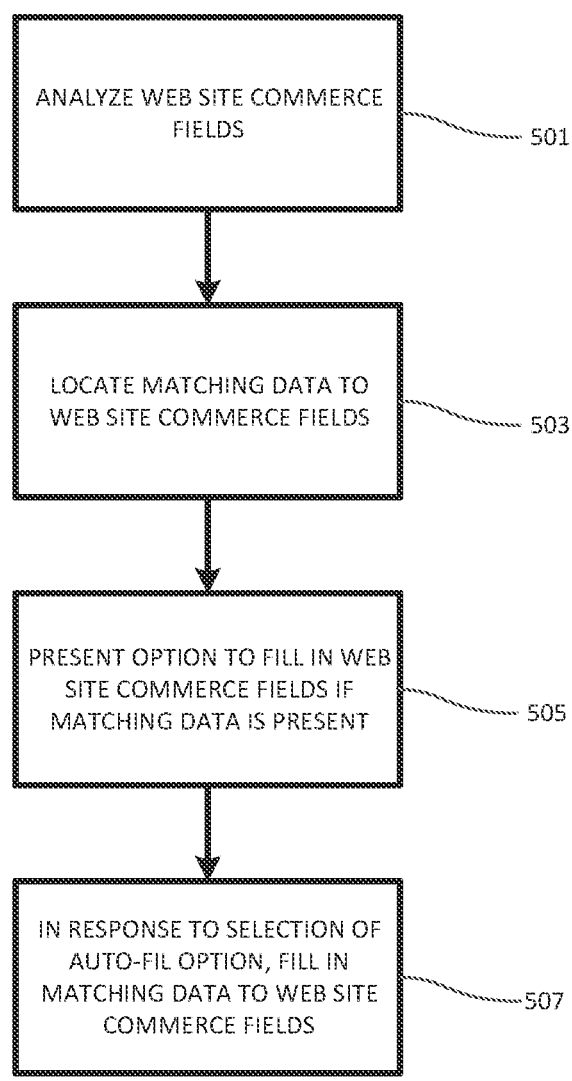
FIG. 5 may illustrate a method of matching up fields in a merchant web site and in data in a memory.

FIG. 5 may illustrate an embodiment of a method of auto-filing payment data 213 in the browser 201. At block 501, the open fields on the ecommerce web site may be analyzed. Referring briefly to FIG. 4a, common open fields may include:

Card number;
Card expiration;
Billing address;
First name;
Last name;
Address;
Town; and
Zip Other codes which are not illustrated in FIG. 4a but may exist may include CCV, billing zip code, mailing address, etc.

At block 503, the text of the web site in the browser 201 may be read and may be compared to known open fields and logical alternatives. For example, "Town" may also mean "City" or "Village" and the system may have the intelligence to know that City data may be inserted where the web site in the browser 201 asks for Town data. As the expedited electronic payment service may be created in advance, the standard field data may be stored remotely but be available to be used to auto-fill the open fields on the web site in the browser 201.

At block 505, an option may be displayed to a user to auto-fill open fields 215 (FIG. 2c) in the merchant website in the browser 201. In some embodiments, hovering over the auto-fill button (not shown) may result in the open field being temporarily filled. The temporary entries may be indicated in a visual manner such as the potential auto-fill entries being noted in gray, in a different font, in a lighter font, etc.

At block 507, if the user selects to use the auto-fill option 215, the extension 207 may place the matching offsite data in the open fields of payment data 213 as if they were typed by the user. In this way, the user may save time and effort from having to perfectly type in the necessary data as even a mistyped letter may result in a transaction being marked as fraudulent. The method of FIG. 5 may end.

Referring again to FIG. 1, at block 115, the transaction may be executed in the web browser 201. The entered payment data 213 may then flow to a payment network where it may be subject to verification analysis, sufficient funds/amounts analysis and fraud analysis. If the various analysis' turn out positive, then the transaction may occur. If the various analysis' find a problem, the transaction may be denied.

In some embodiments, as part of the extension 207, a user may be able to select one payment device 209 from a plurality of payment devices 209. As mentioned previously, a plurality of payment devices 209 may be added to the expedited payment system such as credit cards, debit cards, loyalty cards, coupons, airline miles, bitcoins, etc. Any of these forms of value may be selected and used.

Figure 2A:
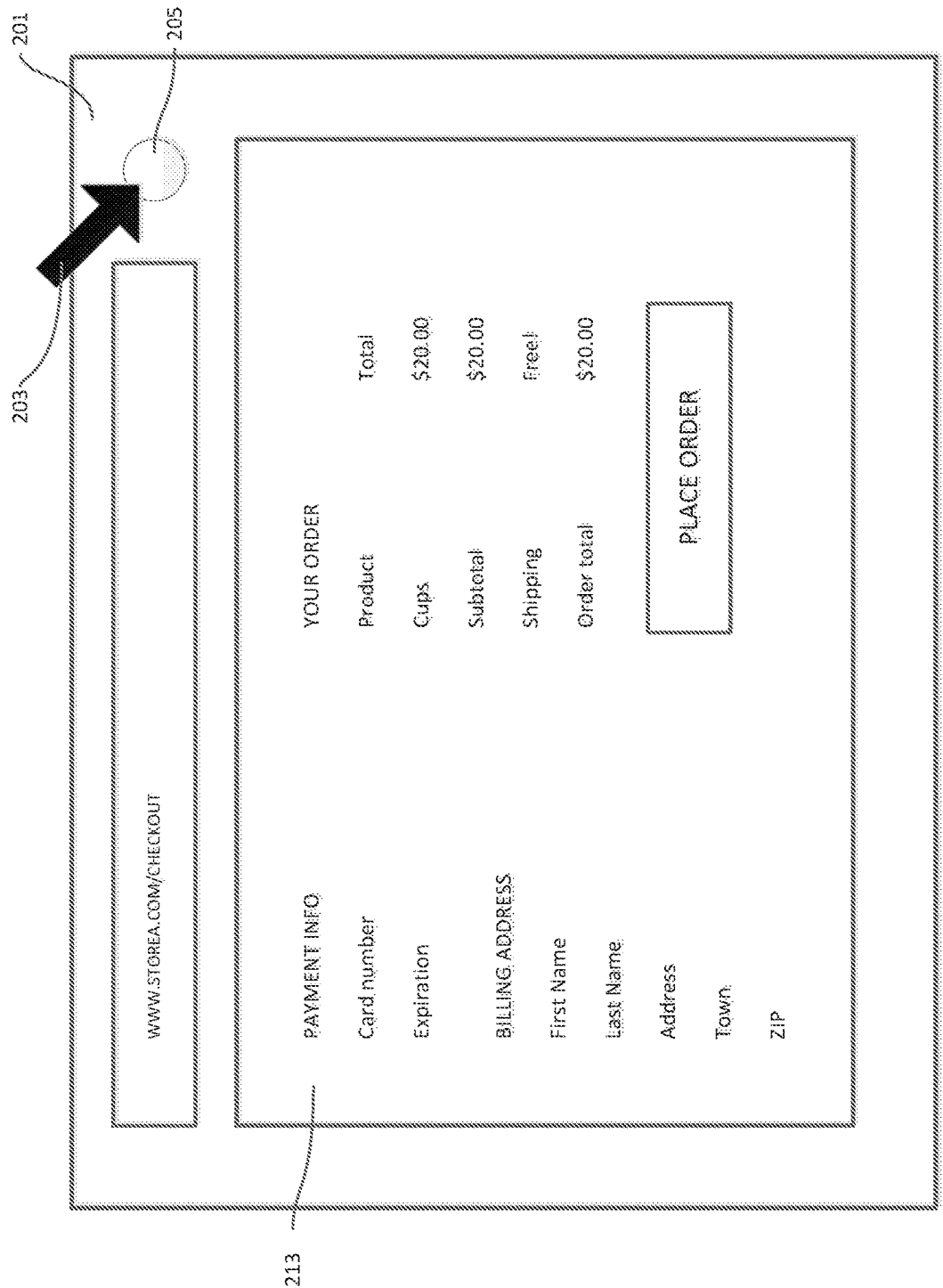
FIG. 2a may be an illustration of a first embodiment of a payment extension.

FIG. 2a may be an illustration of a first embodiment of a payment extension 207 displayed in a browser 201 which is displaying a merchant website. The website illustrated may assume a user has selected goods and services and is ready to pay for the goods/services. The extension may execute if an execute action 203 is received in the extension area 205, such as a user clicking a mouse (extension action) while hovering over the circle (extension area).

Figure 2C:
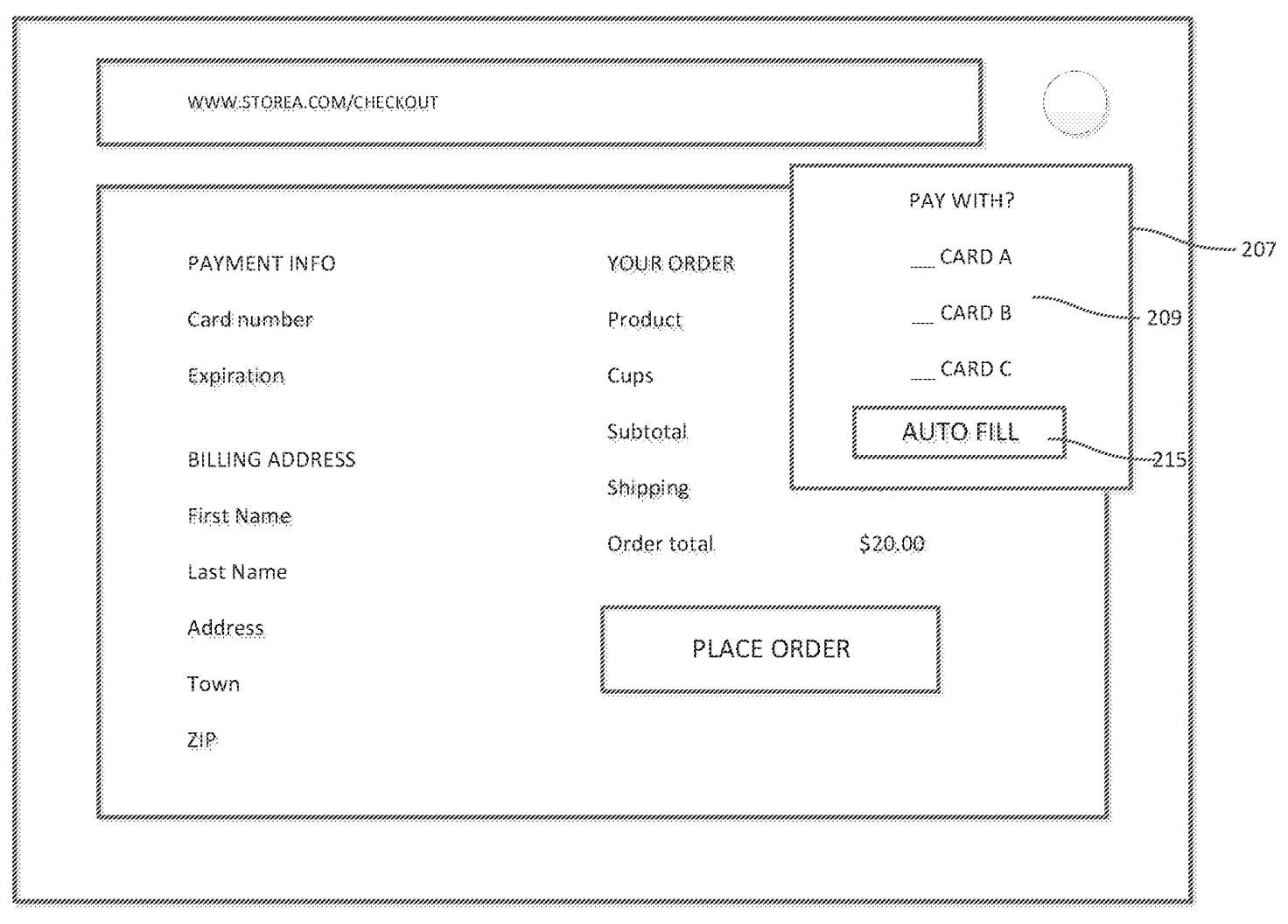

In response to an execute action 203 occurring in the extension area 205, in FIG. 2b, the payment extension 207 may be displayed as a pop up area. In the embodiment illustrated, a user may enter a user name and a password 211 for security and authentication. In response to the name and password being recognized, in FIG. 2c, the user may have the option to select one or more or a plurality of payment devices 209 for the transaction. In some embodiments, a user may be able to assign a percentage to each payment device 209 where the percentage indicates the percent of the purchase that is to be assigned to that payment device. The user may also have an option of whether to autofill 215 the payment display.

Figure 3A:
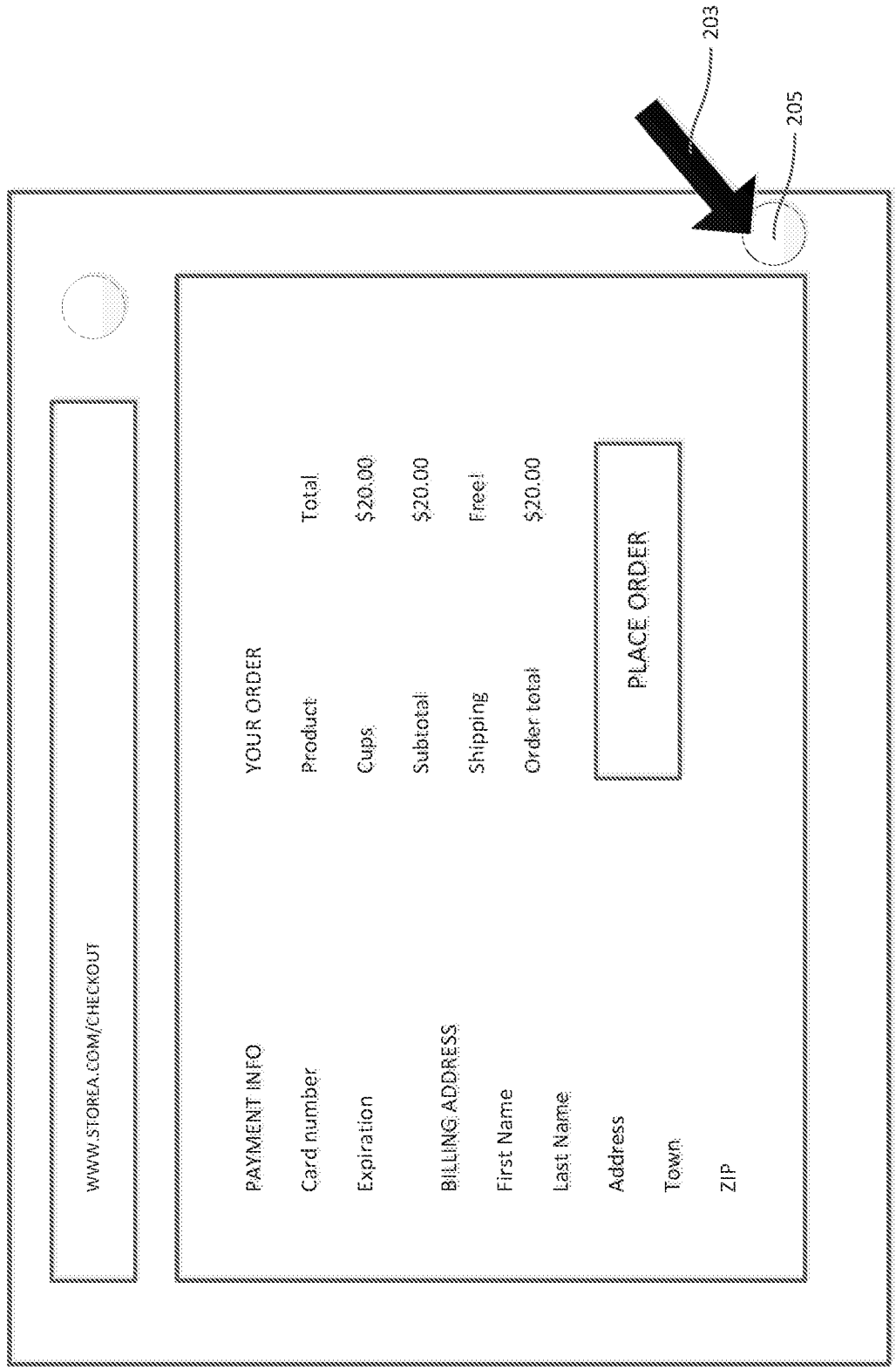
FIG. 3a may be an illustration of a second embodiment of a payment extension being indicated by an extension indicator.

FIG. 3a may be an illustration of a second embodiment of a payment extension 207 being indicated by an extension indicator in an extension area 205. In this embodiment, the extension 207 may be operating in the background and may be indicated by the circle 205. In FIG. 3b, the extension 207 may execute if an activation action 203 (mouse click, finger tap) is received in the extension area 205 (circle) where the extension area 205 may expand into the form as displayed in FIG. 3b.

Figure 6:
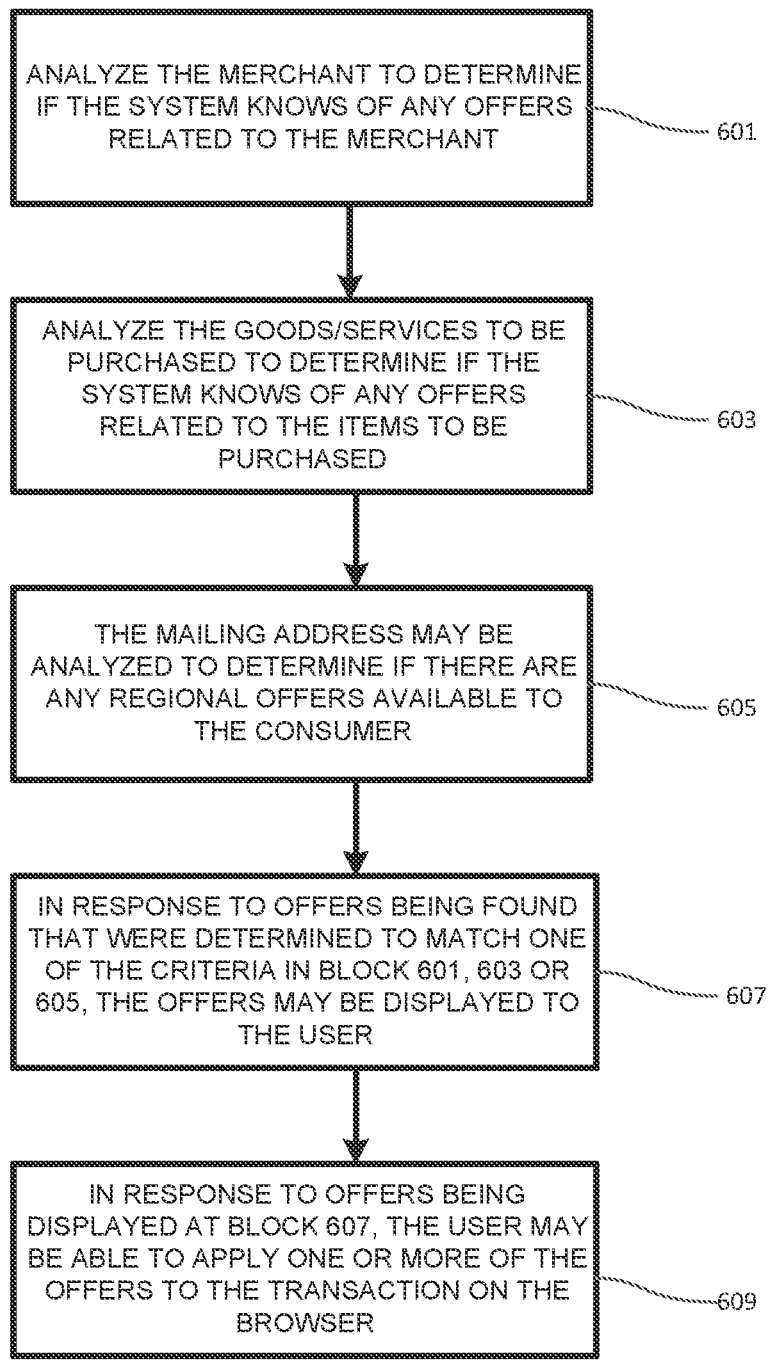
FIG. 6 illustrates a method of determining if there are offers relevant to a pending purchase.

In some embodiments of the system, a user may be able to select to view offers 301 related to the purchase or may be able to use an expedited payment system to complete the transaction. FIG. 6 may illustrate the analysis if the OFFERS button 301 is selected. At block 601, the system may analyze the merchant to determine if the system knows of any offers related to the merchant. At block 603, the system may analyze the goods/services to be purchased to determine if the system knows of any offers related to the items to be purchased. At block 605, the mailing address may be analyzed to determine if there are any regional offers available to the consumer. At block 607, in response to offers being found that were determined to match one of the criteria in block 601, 603 or 605, the offers may be displayed to the user. At block 609, in response to offers being displayed at block 607, the user may be able to apply one or more of the offers to the transaction on the browser. In some embodiments, there may be an option for the expedited payment system to determine which of the various offers would be of the best benefit to the consumer. Thus, the technical challenge of keeping track of offers, codes and which offer would result in the best result for the consumer would be addressed.

Figure 3C:
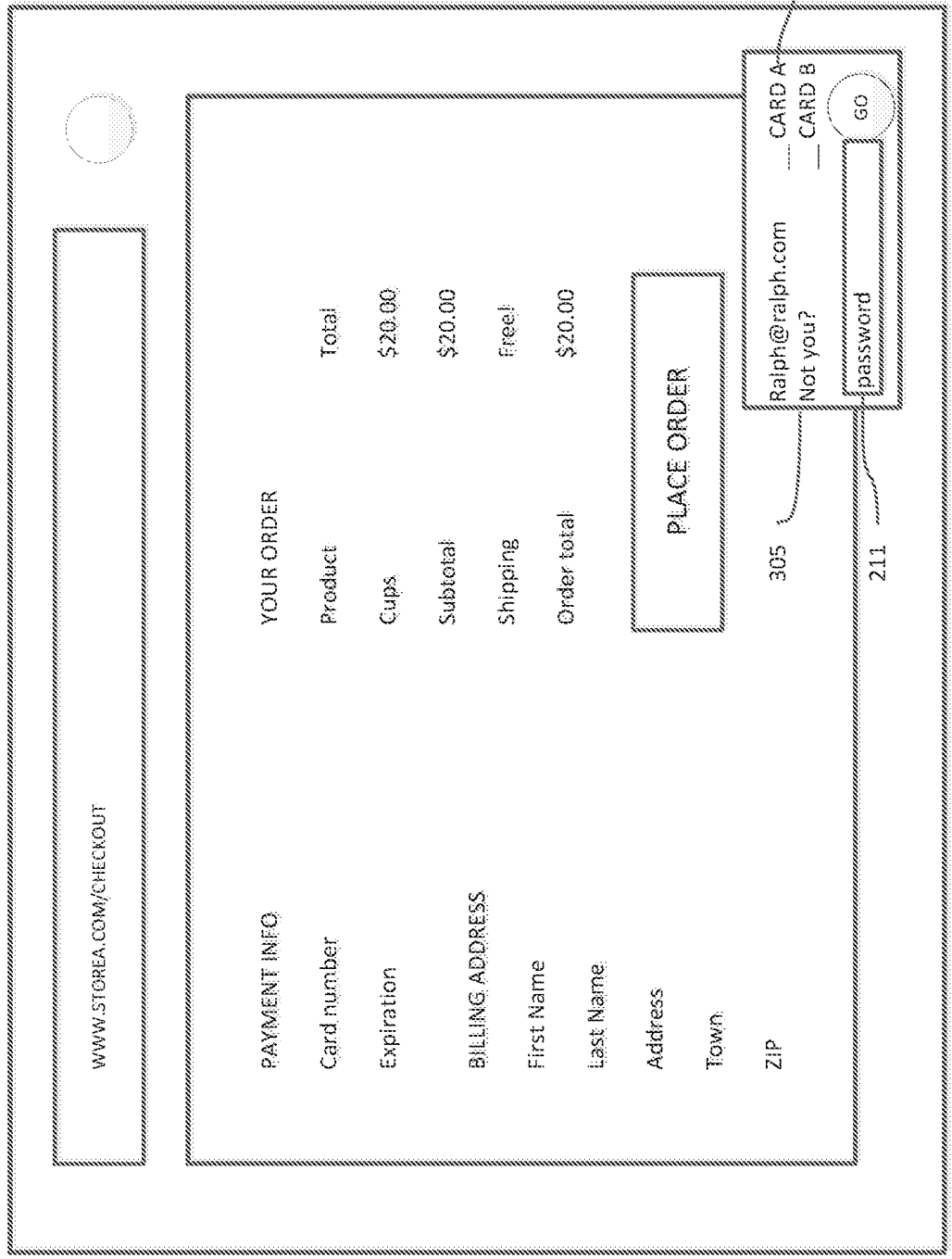
FIG. 3c may be an indication of a second embodiment of a payment extension requesting authentication data and payment device data from a user.

Referring now to FIG. 3c, in response to PAYMENTS or Checkout 303 being selected in FIG. 3b, the expedited payment extension 207 may display a request for authentication data 211 and payment device 209 from a user. As mentioned previously, the authentication data 211 may be a name and password and the payment device data 213 may be a selection of one or may payment devices 209 that have been set up as part of the expedited payment extension 207. In embodiments where a cookie is used to retrieve a user name, the user may be asked to make a selection if the displayed user name is not proper 305. In this way, a user with multiple sign on to use a variety of payment devices may be able to switch between user names and logins.

FIG. 3d may be an illustration of a second embodiment of a payment extension 207 where a user may enter authentication data 211, select a payment device 209 and whether to autofill 215 the payment display. The password 211 that is entered may be hidden from view with asterisks or the like. FIG. 3e may be an illustration of a second embodiment of a payment extension 207 where the transaction has successfully completed as indicated by the extension indicator 205. The illustration may be related to the expedited payment extension, a card issuer, a merchant, etc.

Figure 4D:
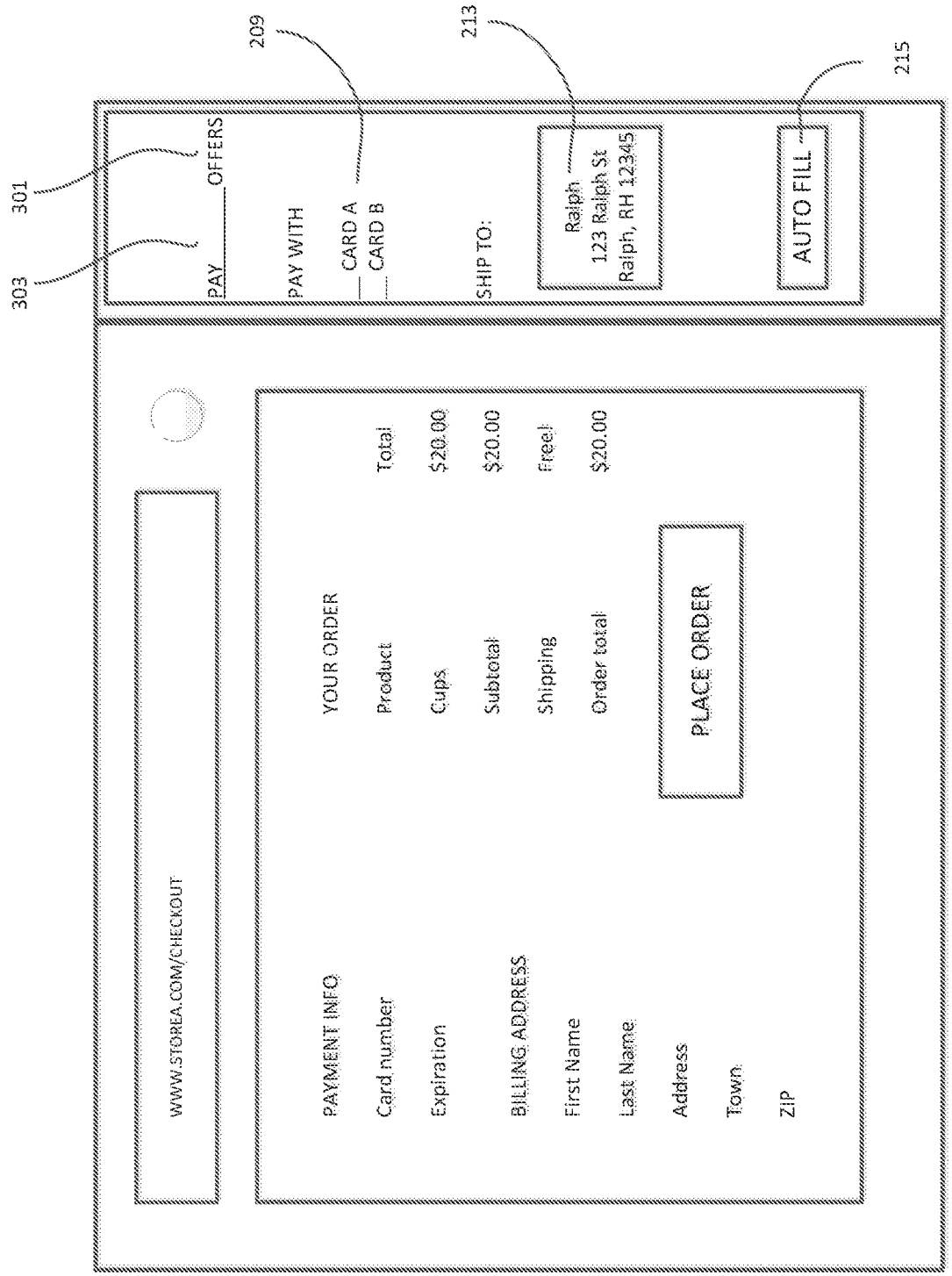
FIG. 4d may be an illustration of a third embodiment of a payment extension appearing as a side bar and allowing a user to select a payment device and whether to autofill the payment display.

FIG. 4a may be an illustration of a third embodiment of a payment extension 207 being activated by selecting or performing an execute action 203 in the extension indication 205. Similar if FIG. 3a, the extension 207 may have an extension indication (circle) 205 which may expand when it receives an activation action 203 (mouse click, finger tap). FIG. 4b may be an illustration of a third embodiment of a payment extension 207 appearing as a side bar and requesting authentication data 211 in response to receiving an execute action 203 in the extension area 205. FIG. 4c may be an illustration of a third embodiment of a payment extension 207 appearing as a side bar and receiving authentication data 211. FIG. 4d may be an illustration of a third embodiment of a payment extension 207 appearing as a side bar and allowing a user to select a payment device 209 and whether to autofill 215 the payment display. Again, the user may be able to select payments or offers and in response to offers being selected, the flow of FIG. 6 as previously explained may be followed.

In some embodiments, users of the payment extension 207 may be able to modify the payment extension 207 in a manner that fits the desires of the user. As part of the extension process, a user may be able to indicate whether the user would prefer the payment extension 207 to be displayed as a pop up, as a side bar, or in another format. Further, the user may be able to select colors, fonts and spacing that are best suited to the user. For example, a user that needs large print may be able to configure the payment extension to use a large and easy to read font. As an added benefit, the user may be confident that the payment extension 207 is not fraudulent as the colors, font and spacing will be as defined by the user.

The browser and extension may use a processor, a memory and an input-output circuit to execute computer executable instructions to give life to the extension 207. The processors (not shown) may be in communication with a network of computing devices, and may be in communication with a payment processing network which may be specifically designed and built to be reliable and secure from outsiders. The processor may be physically configured according to the computer executable instructions to execute the various methods, algorithms, analyses and systems described herein.

There are several technical problems that are addressed with the payment extension 207, some of which are now explained. First, using an expedited payment service requires that a merchant add a plug in (or additional computer instructions) to the merchant web site to make the expedited payment service operate with the merchant web site. Considering the extreme number of merchant web sites, the addition of the expedited payment service computer instructions would require an extreme amount of work by many, many parties. By creating an extension 207, sufficient computer instructions can be downloaded into a browser 201 and may be able to work with virtually any online merchant system with no work from the merchant.

In addition, appropriately filling in forms has long been a challenge. Users become annoyed with repeatedly filling in the same information over and over. Some browsers permit the relevant data to be stored locally such as in an electronic cookie. However, users are not comfortable have the data be so accessible. Thus, more and more user are becoming comfortable with such potentially sensitive information be in the hands of outsiders that are professionals at handling such data in a secure way.

Finally, consumers are becoming more sensitive to displays which appear fraudulent. The described displays may be formatted to create trust and make using the expedited payment service appear to be from a trusted source will enable more users to use the service.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A processor-implemented method of enabling an expedited payment extension in a web browser to execute a purchase transaction on a user account with a merchant website, the method comprising:
   receiving, at a processor, an execute action to an extension area of the web browser to start the expedited payment extension;
   based on receiving the execute action, executing, through the processor, the expedited payment extension in the web browser, wherein the processor executes both the web browser and the expedited payment extension;
   based on executing the expedited payment extension, accessing, through the processor, authentication data by the expedited payment extension from the web browser, wherein the authentication data accessed by the expedited payment extension comprises merchant data corresponding to the merchant website;
   based on accessing the authentication data, communicating, through the processor, the authentication data comprising the merchant data to an authentication authority over a network;
   based on communicating the authentication data to the authentication authority, receiving, at the processor, an authentication approval from the authentication authority over the network;
   based on receiving the authentication approval, receiving, at the processor, payment data comprising a payment token in the web browser from the authentication authority, wherein the payment token is a one-time use code that is unique to the merchant website;
   based on receiving the payment data comprising the payment token, auto-filling, by the processor, the payment data comprising the payment token into at least one field of the web browser; and
   executing, at the processor, the transaction in the web browser executing the expedited payment extension, the transaction being executed in response to the authentication approval and based on auto-filling the payment data comprising the payment token.

2. The method of claim 1, wherein the execute action includes a mouse click and the extension area includes a visual indication in a browser action bar that the expedited payment extension is available.

3. The method of claim 1, wherein the authentication data further includes a password for a sign in name that is stored locally as a browser cookie.

4. The method of claim 1, wherein the network includes a dedicated network that receives the payment data and communicates the payment data to entities of the transaction.

5. The method of claim 1, further comprising receiving a selection at the processor of one payment device from a plurality of payment devices and the authentication data includes an amount available to spend on the selected payment device.

6. The method of claim 1, wherein the authentication data is further used to improve one or more fraud algorithms at the network.

7. The method of claim 1, wherein the extension area comprises at least one of a sidebar, a button, and a graphical user interface.

8. The method of claim 1, further comprising auto-filling one or more of a name, a billing address, and a shipping address in the extension area based on the payment data.

9. The method of claim 1, wherein executing, at the processor, the transaction in the web browser executing the expedited payment extension includes sending the payment data to the network and analyzing the payment data for one or more of verification, sufficient funds/amounts, and fraud.

10. A networked system comprising a processor, a memory and an input-output circuit for enabling an expedited payment extension in a web browser, the processor being physically configured according to computer executable instructions for:
   receiving, at the processor, an execute action to an extension area of the web browser to start the expedited payment extension;
   based on receiving the execute action, executing, through the processor, the expedited payment extension in the web browser, wherein the processor executes both the web browser and the expedited payment extension;
   based on executing the expedited payment extension, accessing, through the processor, authentication data by the expedited payment extension from the web browser, wherein the authentication data accessed by the expedited payment extension comprises merchant data corresponding to a merchant website;
   based on accessing the authentication data, communicating, through the processor, the authentication data comprising the merchant data to an authentication authority over a network;
   based on communicating the authentication data to the authentication authority, receiving, at the processor, an authentication approval from the authentication authority over the network;

based on receiving the authentication approval, receiving, at the processor, payment data comprising a payment token in the web browser from the authentication authority, wherein the payment token is a one-time use code that is unique to the merchant website;

based on receiving the payment data comprising the payment token, auto-filling, by the processor, the payment data comprising the payment token into at least one field of the web browser; and executing, at the processor, in the web browser executing the expedited payment extension, the transaction being executed in response to the authentication approval and based on auto-filling the payment data comprising the payment token.

11. The networked system of claim 10, wherein the execute action includes a mouse click and the extension area includes extension area includes a visual indication in a browser action bar that the expedited payment extension is available.

12. The networked system of claim 10, wherein the authentication data further includes a password for a sign in name that is stored locally as a browser cookie.

13. The networked system of claim 10, wherein the authentication data is communicated to the authentication authority over the network, wherein the network includes a dedicated network that receives the payment data and communicates the payment data to entities of the transaction.

14. The networked system of claim 10, further comprising receiving a selection at the processor of one payment device from a plurality of payment devices and the authentication data includes an amount available to spend on the selected payment device.

15. The networked system of claim 10, wherein the authentication data is further used to improve one or more fraud algorithms at the network.

16. The networked system of claim 10, wherein the extension area comprises at least one of a sidebar, a button, and a graphical user interface.

17. The networked system of claim 10, further comprising auto-filling one or more of a name, a billing address, and a shipping address in the extension area based on the payment data.

18. The networked system of claim 10, wherein executing, at the processor, the transaction in the web browser executing the expedited payment extension includes instructions for sending the payment data to the network and analyzing the payment data for one or more of verification, sufficient funds/amounts, and fraud.

19. The method of claim 10, further comprising displaying, by the processor, a button in the web browser.

20. The method of claim 19, further comprising auto-filling one or more of a name, a billing address, and a shipping address in the extension area based on the payment data, wherein the auto-filling action is performed in response to receiving a selection by a user of the button.

21. The networked system of claim 10, wherein executing, at the processor, the transaction in the web browser executing the expedited payment extension includes instructions for displaying, by the processor, a button in the web browser.

22. The networked system of claim 21, wherein the auto-filling instruction is executed at the processor in response to receiving a selection by a user of the button.

23. A processor-implemented method of enabling an expedited payment extension in a web browser to execute a purchase transaction on a user account with a merchant website, the method comprising:

receiving, at a processor, an execute action to an extension area of the web browser to start the expedited payment extension;

based on receiving the execute action, executing, through the processor, the expedited payment extension in the web browser, wherein the processor executes both the web browser and the expedited payment extension;

based on executing the expedited payment extension, accessing, through the processor, authentication data by the expedited payment extension from the web browser, wherein the authentication data accessed by the expedited payment extension comprises merchant data corresponding to the merchant website;

based on accessing the authentication data, communicating, through the processor, the authentication data comprising the merchant data to an authentication authority;

based on communicating the authentication data to the authentication authority, receiving, at the processor, an authentication approval from the authentication authority;

based on receiving the authentication approval, receiving, at the processor, payment data comprising a payment token in the web browser from the authentication authority, wherein the payment token is a one-time use code that is unique to the merchant website;

based on receiving the payment data comprising the payment token, auto-filling, by the processor, the payment data comprising the payment token into at least one field of the web browser; and executing, at the processor, the transaction in the web browser executing the expedited payment extension, the transaction being executed in response to the authentication approval and based on auto-filling the payment data comprising the payment token.

* * * * *